United States Patent
Behr et al.

(10) Patent No.: US 8,350,184 B2
(45) Date of Patent: Jan. 8, 2013

(54) LASER BEAM WELDING HEAD

(75) Inventors: Friedrick Behr, Ratingen (DE); Erwin Blumensaat, Dortmund (DE); Christian Dornscheidt, Düsseldorf (DE); Martin Koch, Neukirchen-Vluyn (DE); Jens Plha, Düsseldorf (DE); Stefan Wischmann, Berlin (DE); Lars Ott, Düren (DE); Ansgar Schäfer, Aachen (DE)

(73) Assignee: ThyssenKrupp Steel AG, Duisburg (DE)

( * ) Notice: Subject to any disclaimer, the term of this patent is extended or adjusted under 35 U.S.C. 154(b) by 949 days.

(21) Appl. No.: 12/162,921

(22) PCT Filed: Jan. 22, 2007

(86) PCT No.: PCT/EP2007/050617
§ 371 (c)(1), (2), (4) Date: Mar. 3, 2009

(87) PCT Pub. No.: WO2007/088122
PCT Pub. Date: Aug. 9, 2007

(65) Prior Publication Data
US 2009/0302011 A1 Dec. 10, 2009

(30) Foreign Application Priority Data
Feb. 1, 2006 (DE) .......................... 10 2006 004 919

(51) Int. Cl.
*B23K 26/00* (2006.01)
(52) U.S. Cl. .......... 219/121.64; 219/121.63; 219/121.83
(58) Field of Classification Search ............. 219/121.64, 219/121.63, 121.83, 121.78, 121.73
See application file for complete search history.

(56) References Cited

U.S. PATENT DOCUMENTS

| | | | |
|---|---|---|---|
| 4,673,795 A | 6/1987 | Ortiz, Jr. | |
| 4,839,496 A | 6/1989 | Armier et al. | 219/121.63 |
| 4,924,063 A | 5/1990 | Büchel et al. | 219/121.64 |
| 5,674,415 A | 10/1997 | Leong et al. | 219/121.83 |
| 6,034,347 A * | 3/2000 | Alber et al. | 219/121.64 |
| 6,084,223 A * | 7/2000 | Dietz et al. | 219/617 |
| 6,288,359 B1 * | 9/2001 | Koch et al. | 219/121.63 |
| 6,596,961 B2 * | 7/2003 | Ehlers et al. | 219/121.63 |
| 6,998,569 B2 * | 2/2006 | Schumacher | 219/121.63 |
| 2001/0008231 A1 | 7/2001 | Britnell | 219/121.63 |

(Continued)

FOREIGN PATENT DOCUMENTS
DE 87 13 471 U1 12/1987
(Continued)

OTHER PUBLICATIONS
International Search Report for PCT/EP2007/050617.

Primary Examiner — M. Alexandra Elve
(74) Attorney, Agent, or Firm — Proskauer Rose LLP

(57) ABSTRACT

A laser beam welding head for the welding of metal parts and method of use include at least one beam path for a welding beam and means for the optical acquisition of the position of the welding seam at a first measuring position, wherein the means for the optical acquisition of the position of the welding seam allow arrangement of the first measuring position in the welding direction running ahead of the welding position of the welding beam, and, at least as a function of a lateral deviation of the welding seam from a reference position, generate a correction signal for the correction of the welding position of the welding beam, as well as a corresponding use of the laser beam welding head.

18 Claims, 2 Drawing Sheets

U.S. PATENT DOCUMENTS

Figure 1:
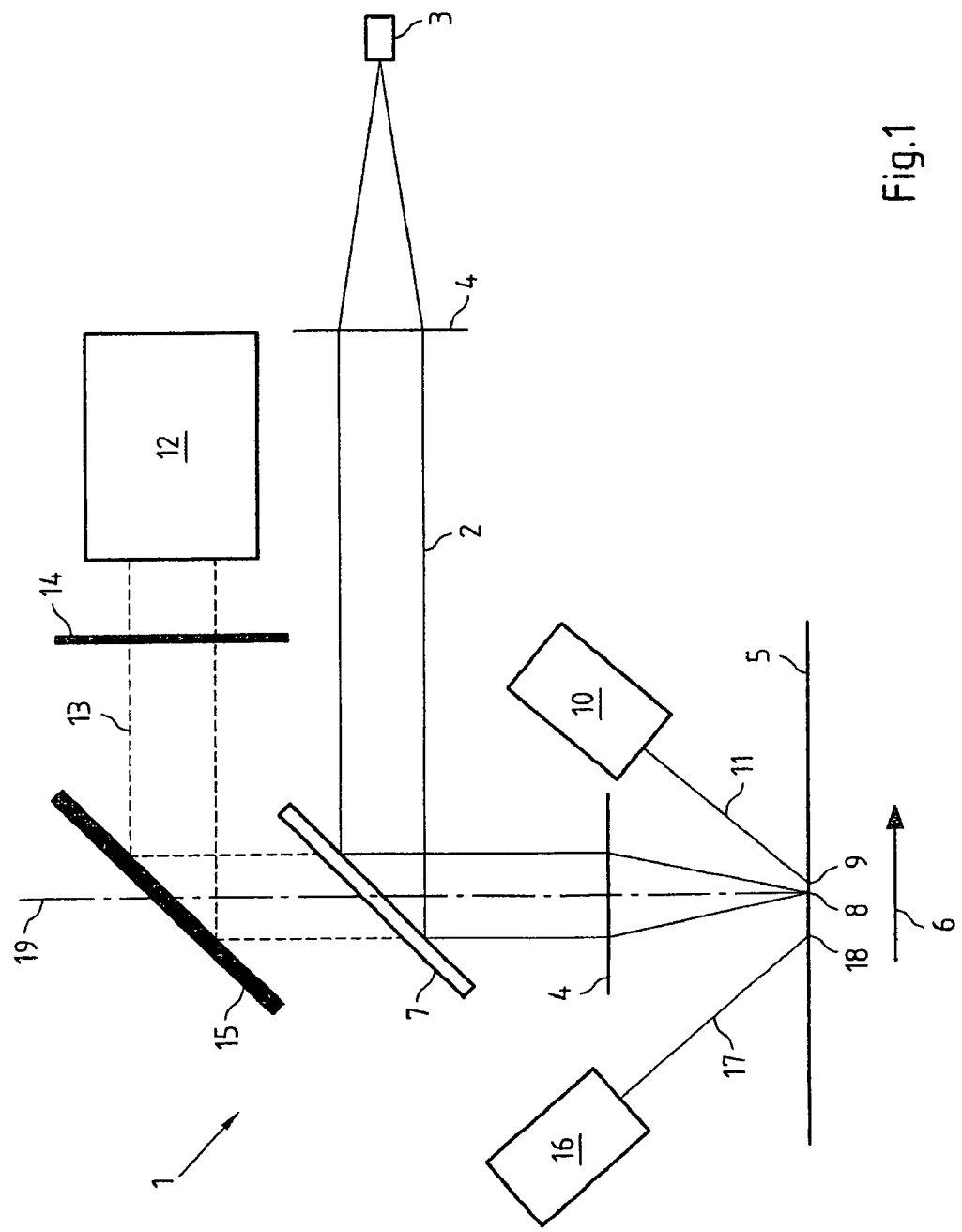

2005/0247681 A1  11/2005  Boillot et al. ............ 219/121.63

FOREIGN PATENT DOCUMENTS

| | | |
|---|---|---|
| DE | 38 30 892 C1 | 9/1989 |
| DE | 103 35 501 A1 | 2/2004 |
| DE | 10 2004 043076 | 4/2005 |
| EP | 0 209 488 A1 | 1/1987 |
| EP | 0 934 796 | 8/1999 |
| FR | 2 847 187 | 5/2004 |
| WO | 03/022509 | 3/2003 |
| WO | 2005/095043 | 10/2005 |

\* cited by examiner

LASER BEAM WELDING HEAD

CROSS-REFERENCE TO RELATED APPLICATIONS

This application is a National Phase Application of International Application No. PCT/EP2007/050617, filed on Jan. 22, 2007, which claims the benefit of and priority to German patent application no. DE 10 2006 004 919.5-34, filed Feb. 1, 2006. The disclosure of the above applications are incorporated herein by reference in their entirety.

FIELD OF THE INVENTION

The invention relates to a laser beam welding head for the welding of metal parts with at least one beam path for a welding beam and means for the optical acquisition of the position of the welding seam at a first measuring position, wherein the means for the optical acquisition of the position of the welding seam allow arrangement of the first measuring position in the welding direction running ahead of the welding position of the welding beam and, at least as a function of a lateral deviation of the welding seam from a reference position, generate a correction signal for the correction of the welding position of the welding beam, as well as to a corresponding use of the laser beam welding head. In addition to this, the present invention relates to a method for the beam welding of metal parts, in which the position of the welding seam is determined by the use of optical acquisition means at a first measuring position running ahead of the welding position of the welding beam and, depending on the deviation of the position of the welding seam from a reference position, a correction signal is generated.

BACKGROUND

When metal components are welded with the use of a welding beam, automated movement devices are frequently used, which, in order to create the desired welding seam, provide the appropriate relative movement between the components which are to be welded and the welding beam. In order to produce the energy densities necessary to create a "key hole" when welding in deep welding mode, the welding beam is, as a rule, very sharply focussed, such that an extremely high positioning precision must be demanded in relation to the automated movement devices in order for a consistent welding seam quality to be provided. In general, as a rule, degrees of positioning precision for the welding beam are required of less than +/−0.15 mm perpendicular to the run of the welding seam, wherein the welding seam is designed as a butt weld or fillet weld. CNC-controlled Cartesian gantry systems fulfil the requirements for positioning precision, but require high investment costs. Multi-axis robots, which in principle are more economical than Cartesian gantry systems, have, because of natural oscillations brought about by the reorientation of their drive units and the softness of the drives, a minimum positioning repetition precision of +/−0.15 mm at particular axial positions. The precision required with dynamic positioning of the welding beam therefore cannot be achieved with multi-axis robots.

Laser beam welding heads are known from the prior art which have additional means for identifying the welding seam position and for correcting the laser welding head. For example, the principle is known from the German published application DE 103 35 501 A1 of determining the actual true path of the laser welding beam head in an advance run window ahead of the welding beam position, comparing it with previously stored reference data, and carrying out a corresponding correction of the position of the welding beam by taking into account the advance run. The problem with this laser beam welding head is that, because of the complex advance run calculation, high welding speeds lead to path deviations.

The International Patent Application WO 2005/095043 A1 discloses a laser beam welding head with means for determining the reference location of the welding seam position, which by means of a triangulation process determine the profile of the reference location of the welding seam close to the current welding position ("key hole") and continuously position the laser welding head relative to the determined position of the reference location of the welding seam. Due to the advance run being taken into account between the welding position and the measured position, for the determination of the position of the reference location of the welding seam, with this laser beam welding head, too, the effort in calculating the correction signal for the laser welding beam head is relatively high, such that only insufficient welding speeds are achieved with suitable precision, in particular in the case of the processing of radii in paths.

SUMMARY OF THE INVENTION

In one aspect, embodiments of the present invention provide a laser beam welding head of the generic type, as well as a method for the beam welding of metal parts, with which a very high dynamic degree of positioning precision can be achieved, with high welding speeds at the same time. Further, an advantageous use of the laser beam welding head is also proposed.

In an embodiment of the present invention includes a laser beam welding head of the generic type, in which a distance interval of a first measuring position running ahead of a welding position of the welding beam is selected in such a way that the correction signal generated can be used directly, in particular without an advance run calculation, to actuate means for correcting the welding position of the welding beam.

It has been shown, surprisingly, that with a sufficiently small distance interval between the arrangement of the first measuring position and the welding position of the welding beam and, respectively, the position of the "key hole" of the welding beam, it is possible to dispense with taking into account the advance run between the measuring position and the position of the welding beam. This results in particularly high speed in respect of the correction of the welding beam position in relation to the deviations in the welding beam position, for example due to the positioning inaccuracies or natural vibrations of a handling system or a multi-axis robot, respectively. Despite the systematic small residual deviation error caused by the small advance run, this surprisingly has no effect on the seam position due to exceeding of the position tolerance. Because the forwarding of the correction signal takes place immediately after the determination of the deviation from the reference position by the means for the optical acquisition of the position of the welding seam, particularly high welding speeds in the range of 10 m/min can be achieved, even with small welding radii, for example of less than 60 mm. Despite this, the required precision of the positioning of the welding beam of +/−0.15 mm could also be maintained even at high welding speeds.

Preferably, the distance interval between the first measuring position and the welding position of the welding beam is a maximum of 3 mm, preferably a maximum of 2 mm. According to the prior art, the optical acquisition of the position of the welding seam is carried out at a greater distance interval from the welding position of the welding beam, such that the advance run must always be taken into account. As a result of the distance interval according to the invention between the first measuring position and the welding position of the welding beam, it is possible, according to embodiments of the invention, for the systematic error to be reduced to such an extent that it no longer exerts an effect on the result in respect of exceeding of the position tolerance.

The dynamics for changing the welding position can, according to another embodiment of the laser beam welding head according to the invention, be improved by the fact that at least one actuator element is provided in the beam path of the welding beam in order to change the welding beam position, which can be actuated by the correction signal. By contrast with the method known from the prior art, of continually moving or actuating the laser beam welding head as a function of the correction signal, an actuator element in the beam path of the welding beam avoids the correction of the position of the welding beam by the movement of large masses, since only the actuator element needs to be changed in its position. As a result of this, the speed of correction can be substantially increased once again, and natural vibrations of the handling can be corrected.

A particularly simple actuator element can be provided in that at least one tiltable mirror is provided, preferably a dichroic mirror, as the actuator element. Tiltable mirrors as actuator elements can be moved or tilted in relation to the laser beam welding head as a whole almost free of inertia, in order to correct the welding beam position according to the correction signal calculated without an advance run. Dichroic mirrors have the advantage that they reflect wavelengths below or above a specific value very well and are almost transparent in the other wavelength range in each case. The beam path of the welding beam in the laser welding head can then also be used as the beam path for the optical acquisition of the welding seam position. To do this, the dichroic mirror is selected in such a way that, for example, it is highly reflective for the wavelength of the welding beam laser and reflects this to the welding position or, respectively, from the welding position to the coupling or, respectively, the source of the welding beam. Other wavelengths pass the dichroic mirror unhindered and can be used for observation of the position of the welding seam. At the same time, by the use of the welding path of the laser welding beam, the structure of the laser welding head according to the invention can be kept simple.

An improvement in the process reliability in the determination of the position of the welding seam is achieved, according to a further developed embodiment of the laser beam welding head according to the invention, in that, as means for the optical position acquisition, first image processing means are provided, in particular a first CMOS camera, and a first line projector for projection of a laser line running lateral to the welding seam is provided at the first measuring position, wherein in the beam path of the first image processing means a filter element is provided, adjusted to the wavelength of the laser line.

Naturally, the laser line which is projected onto the metal parts to be welded laterally to the welding seam, has a different wavelength than that of the welding beam itself. Preferably, the filter element adjusted to the laser line is particularly steep-flanked, in order to suppress as far as possible all the error signals due to the ingress of other wavelengths apart from the wavelength of the laser line into the first image processing means. The CMOS camera preferably used is characterised by particularly short reaction times by line selection, such that correspondingly fast image processing and evaluation are carried out. It is also conceivable, however, for other image processing means to be used, provided that the required evaluation speeds are attained.

It has turned out to be particularly advantageous for provision to be made for a laser source with a wavelength in the near-infrared range, preferably with a wavelength of 805 nm, as a light source for the first line projector, wherein the optical filter element in the beam path of the image processing means has a maximum transmission at 805 nm. As line projectors, laser diodes come into consideration for example, whose laser beam is expanded into a laser line, for example via a cylindrical lens. The filter element can be designed preferably as especially steep-flanked. For example, it may be transparent solely for wavelengths in the range from 805+/−5 nm. In the near-infrared range, the radiation intensity emitted by the welding beam, but also the intensity of heat radiation of the welding seam, are relatively low, such that interference, caused by the coupling in of radiation from the welding process itself in the form of metal vapour light or from the welding seam can be very well suppressed with the use of the corresponding filter elements and laser sources. Accordingly, despite the small distance interval between the first measuring position and the welding position of the welding beam, a high processing reliability in the determination of the deviation in the welding seam position by the first image processing means can be guaranteed.

If the laser line can be projected in relation to the observation axis of the first image processing means at a predetermined angle onto the measuring position, the advantageous light section principle can be used in order also to obtain, in addition to the lateral displacement, information about the vertical deviation of the reference position of the seam. The profile values obtained for the welding seam can therefore not only be used for the lateral correction of the welding position of the laser beam welding head, but also for a correction of the welding position in the vertical direction. For example, for the vertical correction of the welding position, such as the focus of the welding beam, additional actuator elements can be provided in the beam path of the welding beam.

According to another embodiment of the laser beam welding head according to the invention, further optical elements, in particular path-folding mirrors, are provided in the beam path of the first image processing mean, such that the structure of the laser beam welding head according to the invention can be designed as particularly compact.

With further means for the optical acquisition of a second measuring position in the welding direction, running behind the welding position of the welding beam, it is possible to carry out a follow-up inspection of the welding seam quality simultaneously.

The light section principle can, according to a further embodiment of the laser beam welding head according to the invention, be used for the determination of the geometry of the welding seam produced in that, for the optical acquisition of the second measuring position, a second line projector is provided for projection of a second laser line at the second measuring position lateral to the welding seam and second image processing means, in particular a second CMOS camera, for observation of the second measuring position and the laser line of the second line projector is projected in relation to the observation axis of the image processing means at a predetermined angle onto the measuring position and, optionally, a filter element adjusted to the second laser line is provided in the beam path of the second image processing means.

However, a second filter element and an additional beam path for the second image processing means can be done without if a first and a second line projector are provided which emit a laser line with the same wavelength, preferably a wavelength of 805 nm. In this case, both image processing means can make use of the same beam path and the same filter element. If, for example, the first and the second measuring position are formed at two different locations in one image plane of the beam path, the image processing means can only pick up the measuring signals from the different measuring positions separately by means of an adjacent arrangement in the image plane in the beam path. It is also possible, however, for only one image processing means to be provided, of which individual measuring ranges allocated to the measuring positions can be read or, respectively, evaluated separately.

Preferably, fiber coupling is provided in the laser beam welding head for coupling-in the welding beam, such that no laser sources are arranged at the laser beam welding head itself and this can be designed more simply. It is also readily conceivable, however, for laser sources, such as diode lasers, to be secured at the laser beam welding head and for fiber coupling of the welding beam to be done without.

According to a second aspect of the present invention, a laser beam welding head according to embodiments of the invention is used with a handling system, in particular a folding arm multi-axis robot, for the welding of metal parts, in particular for the welding of "engineered blanks". On the one hand, by means of the use of the laser beam welding head according to the invention the dynamic position precision of the welding seam with metal parts to be welded is perceptibly increased, while on the other hand the use of economical folding arm multi-axis robots is rendered possible by this use. This is particularly advantageous with the welding of "engineered blanks". "Engineered blanks" are metal parts which are manufactured by welding with other metal parts or, respectively, sheets to form semi-finished products which are designed to be load-compatible, in which the exact positioning of the weld seam plays a decisive role in respect of the loading capacity of the "engineered blanks". Although the welding radii are in part less than 60 mm, and precision of positioning of the welding seam of +/−0.15 mm is required, the use according to the invention of the laser beam welding head enables rapid and economical manufacture of "engineered blanks" with high quality.

According to a third aspect of the present invention, a method for the beam welding of metal parts is provided, in which the distance interval of the first measuring position from the position of the welding beam is small and the correction signal is used directly, in particular without an advance calculation, for the actuation of means for correcting the welding position of the welding beam. As has already been demonstrated above, by providing the small distance interval between the first measuring position and the welding position of the welding beam the advance run of the first measuring position to the position of the welding beam, surprisingly, can be disregarded in the correction calculation. As a result, a particularly simple and rapid calculation of the deviation of the weld seam from a reference position is provided. Thanks to the almost instantaneous ("close to real time") taking into account of the position of the welding seam, natural oscillations of the handling system and imprecisions in the positioning of the laser beam welding head are corrected even at high welding speeds of more than 10 m/min.

Preferably, the distance interval between the first measuring position and the position of the welding beam is a maximum of 3 mm and preferably a maximum of 2 mm. The position of the welding beam determines the location of penetration of the "key hole", which as a rule is formed when welding metal parts. Despite the advance run of a maximum of 3 mm, preferably a maximum of 2 mm, surprisingly the systematic error which occurs when the advance run is not taken into account can nevertheless be ignored and a rapid, direct correction of the welding position of the welding beam, in particular free of an advance run calculation, can be used, in order to guarantee a welding seam precision of +/−0.15 mm.

In order to allow for the most rapid correction possible of the position of the welding beam relative to the welding seam, at least one actuator element is actuated in the beam path of the welding beam of the laser beam welding head, at least making use of the correction signal according to a next embodiment of the method according to the invention. The movement of inert masses, which during the change of position of the welding beam could lead to additional imprecisions, is thereby minimized.

According to another embodiment of the method according to the invention, a tiltable mirror, in particular a dichroic mirror, is actuated as an actuator element. As indicated previously, on the one hand a dichroic mirror fulfils the function of a mirror for specific wavelengths, for example in the range of the wavelength of the welding beam. On the other hand, the dichroic mirror can be essentially transparent for the wavelengths which are used, for example, to determine the position of the welding seam. Due to the tilting movement of the dichroic mirror, the welding beam can be pivoted into a desired position, preferably lateral to the welding seam, without changing the beam path of the optical acquisition. At the same time, the dichroic filter can serve to separate the process light in the beam path of the welding beam and then in the beam path of the first observation means. It is also conceivable, however, that by means of one or more further actuator elements or mirrors, the focus point of the laser beam is displaced vertically to the welding seam directly dependent on the correction signal.

A particularly high degree of process reliability is achieved according to another embodiment of the method according to the invention, in that a first line projector projects a laser line at the first measuring projection and first image processing means, in particular a first CMOS camera, optically evaluates the first measuring position, wherein a filter element arranged in the beam path of the image processing means and adjusted to the laser line filters the optical signal from the first measuring position. Thanks to the combination of the laser line in conjunction with the additional filter element, the optical signal from the measuring position can be adjusted very well to an extremely narrow wavelength range, namely that of the laser line. As a result of this, the situation is reached in which the measuring signal of the first image processing means has a particularly good signal-to-noise ratio.

Preferably, the first laser line is projected at an angle to the observation axis of the first image processing means onto the first measuring position and the evaluation of the first measuring position by the image processing means is effected according to the light section principle. The laser line is therefore not projected co-axially onto the first measuring position. As already described, by means of the light section principle with the aid of the triangulation method, as well as the lateral deviation it is possible simultaneously to determine, corresponding to a profile measurement, the deviation of the reference location of the welding seam position in the vertical direction, such that the welding position of the welding beam can also be adapted to deviations in the direction vertical to the welding seam. In addition to this, it is possible, in a particularly simple manner by means of image processing methods, to determine from the profile the exact welding seam position and thereby to easily calculate the deviation from the reference position. Thanks to the overall low calculation effort required, the correction speed is increased still further.

If the line projector emits a laser line with a wavelength in the near-infrared range, in particular with a wavelength of 805 nm, the process reliability in the determination of the welding seam position can be increased still further, since in this wavelength range, with the aid of an edge filter, neither the welding beam itself, nor the heat radiation emitted by the welding seam, nor the metal vapour lights, create strong interference signals in the image processing means. This is of advantage in particular in the event of small distance intervals between the welding position of the welding beam and the first measuring position.

Finally, the quality of the second welding seam can be checked in that, at a second measuring position in the welding direction, running after the welding position of the welding beam, an optical acquisition of the welding seam which has been created is effected.

Advantageously, for the optical acquisition of the welding seam which has been created, a second line projector projects a laser line laterally to the welding seam at the second measuring position, wherein the laser line projects at an angle to the observation axis of second image processing means, in particular a second CMOS camera, at the second measuring position and the light section principle is used to evaluate the measurement at the second measuring position. The method according to the invention integrates not only a particularly rapid and precise correction of the welding position with quality monitoring of the welding seam, but also makes a compact design of the laser beam welding head possible, in particular if the measurement at the second measuring position is carried out with a laser line of the same wavelength as at the first measuring position.

DETAILED DESCRIPTION OF THE DRAWINGS

There are now a large number of possibilities for designing and refining the laser beam welding head according to the invention, as well as the method according to the invention for the welding of metal parts. Reference is made to the description of an exemplary embodiment of a laser beam welding head according to the invention in conjunction with the drawings. The drawings show in FIG. 1 in a diagrammatic section view, the beam paths of an exemplary embodiment of the laser beam welding head according to the invention, and FIG. 2 in a diagram, the systematic residual deviations measured with the exemplary embodiment from FIG. 1, as a function of the distance interval from the first measuring position to the welding position.

DESCRIPTION

In FIG. 1, firstly the beam path 2 of the welding beam of an exemplary embodiment of the laser beam welding head 1 according to the invention is represented in diagrammatic form. The welding beam 2 is preferably coupled-in by way of a fiber coupling 3 into the laser beam welding head. By means of the optical elements 4, the welding beam 2 is focussed onto the metal parts 5 which are to be welded. The focussing then in most cases causes the formation of a "key hole", not shown, through the laser plasma which is formed, which then creates the welding seam and so indicates the welding position of the welding beam 2. The metal parts 5 to be welded move relative to the laser beam welding head 1 in the direction indicated by the arrow 6. In the exemplary embodiment shown of a laser beam welding head 1 according to the invention, provision is made in the beam path of the welding beam 2 for a dichroic mirror 7, which as an actuator element can carry out tilting movements. The tilt axis of the dichroic mirror 7 can, for example, lie parallel to the drawing plane, such that, by an actuation of the dichroic mirror 7, the welding position 8 of the welding beam perpendicular to the plane of the drawing, i.e. lateral to the welding direction 6, can be altered. Running ahead in the welding direction 6 a first measuring position 9 is provided, at which a line projector 10 projects a laser line 11 at an angle to the observation axis of image processing means 12 laterally to the welding seam. With the observation means 12, which can, for example, be realised by means of a CMOS camera, it is now possible, by means of the light section principle for the profile of the welding seam to be observed in front of the welding, since the dichroic mirror 7 is transparent for the wavelength of the laser line emitted by the line projector. In accordance with the beam path 13 drawn in, the image of the projected laser line 11 on the welding seam is measured by the image processing means 12. Due to the fact that not only the dichroic mirror 7 but also an additional filter element 14 is provided in the beam path of the image processing means 12, any interference caused by the welding beam 2 itself, by metal spatter, the heat radiation from the welding seam or the metal vapour lights, above the "key hole" are suppressed, and only the laser line, and therefore the measured profile of the welding seam are optically evaluated. Weld spatter illuminated by the lines (160 units/s) lead to about a 2% measurement point error, which can be "calculated out" as outliers by an algorithm, for example by yes/no interrogation.

By the use of triangulation processes, in accordance with the light section principle, the position of the welding seam at the first measuring position 9 can be determined exactly and with high speed. From the measured deviation of the current position of the welding seam from a reference position, according to the invention a correction signal is sent directly, in particular without taking into consideration the advance run of the measuring position 9 to the welding position 8, for correction, for example, to the tiltable mirror 7. This then carries out correction of the welding position 8 of the welding beam 2 by a corresponding alteration of its position. The dynamics of the tiltable mirror 7 in this situation are arranged in such a way that the position of the welding beam 2 can be corrected within the remaining advance run time.

The additional mirror 15 can be provided in order to make possible, in addition, a more compact design of the laser beam welding head 1 according to the invention. Because of the many application possibilities, for example in relation to the welding of fillet welds, the size of the laser beam welding head 1 can likewise acquire practical significance.

To monitor the welding seam which is produced, a further line projector 16 is provided in the exemplary embodiment represented, which in turn projects at an angle to the observation axis of the image processing means 12 a laser line 17 onto the welding seam laterally to the welding direction 6 at a second measuring position 18. Because the first and second measuring positions can be easily separated from one another in the beam path, provision is made, preferably in the image processing means 12, for each measuring position, for a CMOS camera or another plane optical sensor for optical evaluation, which for the sake of simplicity are not shown in FIG. 1.

By using two different CMOS cameras for each measuring position 9, 18, smaller CMOS cameras with a lower pixel number can be used, which can be read independently of one another. With the same degree of precision, the dynamics of the correction of the welding position can then be increased on the basis of the lower measurement or, respectively, reading time for the CMOS cameras for determining the deviation of the welding seam from the reference position. It is also conceivable, however, for one single CMOS camera to be divided into two different segments which are evaluated separately.

Due to the fact that a calculation of the advance run of the first measuring position 9 for correcting the welding position 8 does not take place according to the invention, a particularly high dynamic of seam tracking can be achieved, wherein high welding speeds of more than 10 m/min can be achieved at the same time. Thanks to the rapid correction, the laser beam welding head 1 according to the invention is able to compensate for the natural oscillations of a multi-axis robot and positioning imprecisions.

Due to the low calculation effort involved with the laser beam welding head 1 according to the invention, it is also conceivable for this to be equipped with additional and more powerful advance-run measuring means for the acquisition of the position of the welding seam, not represented in FIG. 1, in order to make possible a two-stage position determination of the welding position 8.

The high precision of the welding seam tracing of the laser beam welding head 1 according to the invention is of particular advantage in particular when welding seam radii of less than 60 mm occur. Thanks to the robust measuring process for the seam tracing and the rapid correction, small radii of this type can be readily welded with the laser beam welding head 1 according to the invention by making use of a multi-axis robot.

Figure 2:
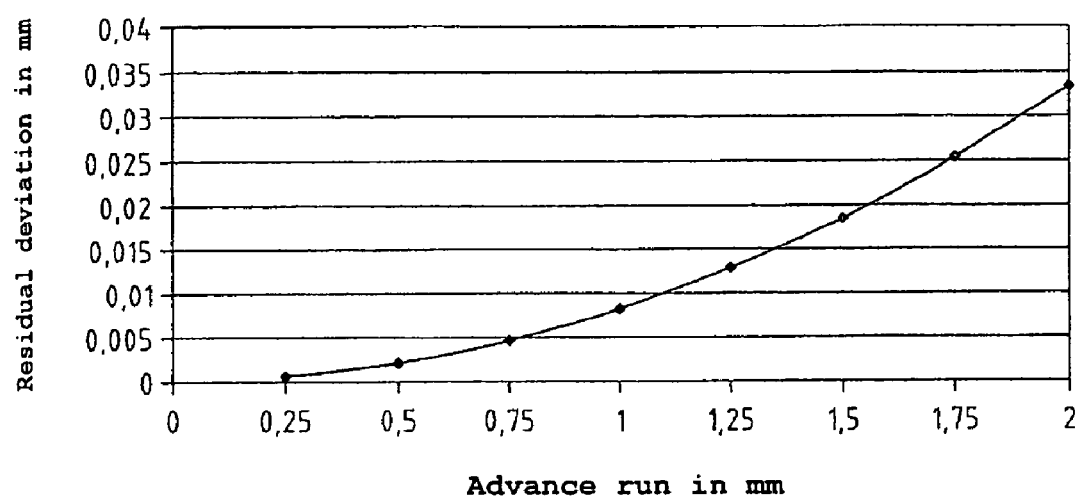

Determination of the residual deviation error which is systematically created by disregarding the advance run as a function of the distance interval between the first measuring position and the actual welding position is represented in the diagram in FIG. 2.

For measurement of the residual deviation from FIG. 2, use was made, for example, of a line projector 10, which emits a laser line 11 with a wavelength of 805 nm with a line dimension of 6×0.05 mm. The resolution of the optical image processing means 12, a CMOS camera, amounted in the z-direction and the x-direction to 20 µm. In addition to this, a steep-flanked filter element 14 was used with a transmission window at a wavelength of 805+/−5 nm in the beam path of the image processing means.

With an advance run of 2 mm, i.e. with a distance interval between the measuring position 9 and the welding position 8 of 2 mm, the residual deviation amounts to only 0.035 mm, and is therefore clearly below the precision limit required. In the advance run range of 0.25 mm, the residual deviation approaches the resolution limit, such that this can no longer be registered. The results represented in FIG. 2 in respect of the residual deviation, i.e. the systematic error if the advance run is ignored, were measured with a seam run with a radius of 60 mm at a welding speed in excess of 10 m/min. From this it becomes clear that the degrees of precision with an approximately straight run of the welding seam can be perceptibly higher via the method according to the invention or by using the welding head according to the invention.

The invention claimed is:

1. Laser beam welding head for the welding of metal parts with at least one beam path for a welding beam and means for optical acquisition of a position of the welding seam at a first measuring position, wherein the means for the optical acquisition of the position of the welding seam allow arrangement of the first measuring position at least in a welding direction running ahead of the welding position of the welding beam and, at least as a function of a lateral deviation of the welding seam from a reference position, generate a correction signal for the correction of the welding position of the welding beam, wherein a distance interval from the first measuring position running ahead to the welding position of the welding beam is selected in such a way that the correction signal generated is used directly without considering the leader length of the first measuring position and without an advance run calculation to actuate means for correcting the welding position of the welding beam, the laser beam welding head including at least one actuator element is provided in the at least one beam path of the welding beam in order to change the welding beam position, which can be actuated by the correction signal, wherein, as the actuator element, at least one tiltable mirror is provided.

2. Laser beam welding head according to claim 1, wherein the distance interval from the first measuring position to the welding position of the welding beam amounts to a maximum of 3 mm.

3. Laser beam welding head according to claim 1, wherein as means for optical acquisition of the position, first image processing means are provided, and a first line projector for projection of a laser line running lateral to the welding seam is provided at the first measuring position, wherein in a beam path of the first image processing means a filter element is provided, adjusted to a wavelength of the laser line.

4. Laser beam welding head according to claim 1, wherein as a light source for a first line projector, a laser source is provided with a wavelength in the near-infrared range, and an optical filter element in a beam path of the first image processing means has a maximum transmission at a wavelength of 805 nm.

5. Laser beam welding head according to claim 1, wherein a laser line can be projected in relation to an observation axis of a first image processing means at a predetermined angle onto the first measuring position.

6. Laser beam welding head according to claim 1, wherein further optical elements are provided in a beam path of the first image processing means.

7. Laser beam welding head according to claim 1, wherein further means are provided for optical acquisition of a second measuring position in the welding direction running behind the welding position of the welding beam.

8. Laser beam welding head according to claim 7, wherein for optical acquisition of the second measuring position, a second line projector is provided for projection of a second laser line at the second measuring position and second image processing means for observation of the second measuring position, the second laser line of the second line projector is projected in relation to an observation axis of the second imaging processing means at a predetermined angle onto the measuring position, and, optionally, a filter element, adjusted to the second laser line, is provided in a beam path of the second image processing means.

9. Laser beam welding head according to claim 1, wherein a first and a second line projector are provided, which emit a laser line with the same wavelength.

10. Laser beam welding head according to claim 1, wherein a fiber coupler is provided in the laser beam welding head for coupling the welding beam.

11. Use of a laser beam welding head according to claim 1 with a handling system for welding metal parts.

12. Method for the beam welding of metal parts with the use of a laser beam welding head in which position of the welding seam is determined by use of optical acquisition means at a first measuring position running ahead of a welding position of the welding beam, and, depending on the deviation of the position of the welding seam from a reference position, a correction signal is generated, wherein a distance interval between the first measuring position and the position of the welding beam is small and the correction signal is used directly without considering the leader length of the first measuring position and without an advance run calculation for actuating means for correcting the welding position of the welding beam, wherein at least one actuator element in a beam path of the welding beam of the laser beam welding head is actuated at least with the use of the correction signal, wherein, as the actuator element, a tiltable mirror is actuated.

13. Method according to claim 12, wherein the distance interval between the first measuring position and the position of the welding beam is a maximum of 3 mm.

14. Method according to claim 12, wherein a first line projector projects a laser line laterally to the welding seam at the first measuring position, and first image processing means optically evaluate the first measuring position, wherein a filter element arranged in a beam path of the image processing means and adjusted to a wavelength of the laser line filters the optical measuring signal of the first measuring position.

15. Method according to claim 12, wherein a first laser line is projected at an angle to an observation axis of a first image processing means onto the first measuring position and evaluation of the first measuring position takes place by the image processing means in accordance with the light section principle.

16. Method according to claim 12, wherein a line projector emits a laser line with a wavelength in the near-infrared range.

17. Method according to claim 12, wherein at a second measuring position in a welding direction, running after the welding position of the welding beam, optical acquisition of the welding seam which has been created is carried out.

18. Method according to claim 17, wherein for optical acquisition of the welding seam which has been created, a second line projector projects a laser line at the second measuring position, wherein the laser line is projected at an angle to the observation axis of second image processing means at the second measuring position, and the light section principle is used for evaluation of the measurement at the second measuring position.

* * * * *

UNITED STATES PATENT AND TRADEMARK OFFICE
CERTIFICATE OF CORRECTION

PATENT NO. : 8,350,184 B2
APPLICATION NO. : 12/162921
DATED : January 8, 2013
INVENTOR(S) : Freidrich Behr et al.

Page 1 of 1

It is certified that error appears in the above-identified patent and that said Letters Patent is hereby corrected as shown below:

On the title page:

Item (75) Inventors:

Freidrick Behr, Ratingen (DE)

should be:

Freidrich Behr, Ratingen (DE)

Signed and Sealed this
Second Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,350,184 B2
APPLICATION NO. : 12/162921
DATED : January 8, 2013
INVENTOR(S) : Behr et al.

Page 1 of 1

It is certified that error appears in the above-identified patent and that said Letters Patent is hereby corrected as shown below:

On the title page:

Item (75) Inventors:

Freidrick Behr, Ratingen (DE)

should be:

Friedrich Behr, Ratingen (DE)

This certificate supersedes the Certificate of Correction issued April 2, 2013.

Signed and Sealed this
Twentieth Day of August, 2013

Teresa Stanek Rea
*Acting Director of the United States Patent and Trademark Office*